United States Patent [19]

Tiffany

[11] 4,253,595
[45] Mar. 3, 1981

[54] TRUNK MOUNTED CARGO CARRIER

[76] Inventor: Charles E. Tiffany, 5100 Abington Rd., Troy, Mich. 48098

[21] Appl. No.: 119,341

[22] Filed: Feb. 7, 1980

[51] Int. Cl.³ .............................................. B60R 9/04
[52] U.S. Cl. .................................... 224/328; 280/769
[58] Field of Search ............... 224/328, 329, 309, 327; 280/769; 220/315, 324, 1.5

[56] References Cited

U.S. PATENT DOCUMENTS

| 3,145,889 | 8/1964 | Altman, Jr. et al. | 224/328 |
| 3,228,575 | 1/1966 | Peterson | 224/328 |
| 3,476,162 | 11/1969 | McMiller | 224/328 X |
| 3,565,305 | 2/1971 | Belokin, Jr. | 224/328 |

Primary Examiner—Steven M. Pollard
Attorney, Agent, or Firm—McGlynn and Milton

[57] ABSTRACT

A cargo carrier for attachment to a body surface of a vehicle and comprising a base, a dome including side walls adapted to receive the base and having holes therein and at least one strap threadedly engaging one of the holes in one of the side walls and extending under the base and threadedly engaging one of the holes in the opposite of the side walls for securing the dome and base together. The strap includes two end portions having hooks thereon for adjustably securing the assembly to a body surface of the vehicle.

8 Claims, 4 Drawing Figures

TRUNK MOUNTED CARGO CARRIER

BACKGROUND OF THE INVENTION (1) Field of the Invention

The subject invention relates to cargo carriers mounted on a car which completely enclose the cargo.

(2) Description of the Prior Art

An ideal car cargo carrier is one which is lightweight yet sturdy enough to hold a substantial amount of cargo. It should also be simple in design and require minimal production costs.

Generally, hood or trunk-mounted cargo carriers include a body portion, a lid portion and an attachment means for securing the carrier to either the trunk or hood of a car. Adjustable straps have been commonly used to serve this purpose, however, prior art assemblies have always included additional members to be secured to either a base or lid in order to adapt the assembly to receive the strap members. These additional parts require increased production time and substantially additional costs due to the parts required. These extra parts also add additional weight and bulk to an assembly.

SUMMARY OF THE INVENTION

The instant invention provides a cargo carrier for attachment to a body surface of a vehicle. The assembly comprises a base member, a dome member including side walls adapted to receive the base member and having holes therein and at least one strap member. The strap member threadedly engages one of the holes in one of the side walls, extends under the base member and threadedly engages one of the holes in the opposite of the side walls thereby securing the dome member and base member together. The strap member includes two end portions having hooks thereon for adjustably securing the assembly to the body surface of a vehicle.

PRIOR ART STATEMENT

The U.S. Pat. Nos. 3,228,575 to Peterson issued Jan. 11, 1966 and 3,565,305 to Belckin issued Feb. 23, 1971 are examples of cargo carriers mounted to the trunk hood or top of a car. Both patents teach a strap member for securing the carrier to a body surface, however, the Peterson patent requires an additional handle member secured to the assembly for receiving the strap member. The Belckin patent requires an additional bracket for the same purpose. These additional parts require increases in cost due to additional materials and time of production. They also add additional weight and bulk to the assemblies.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
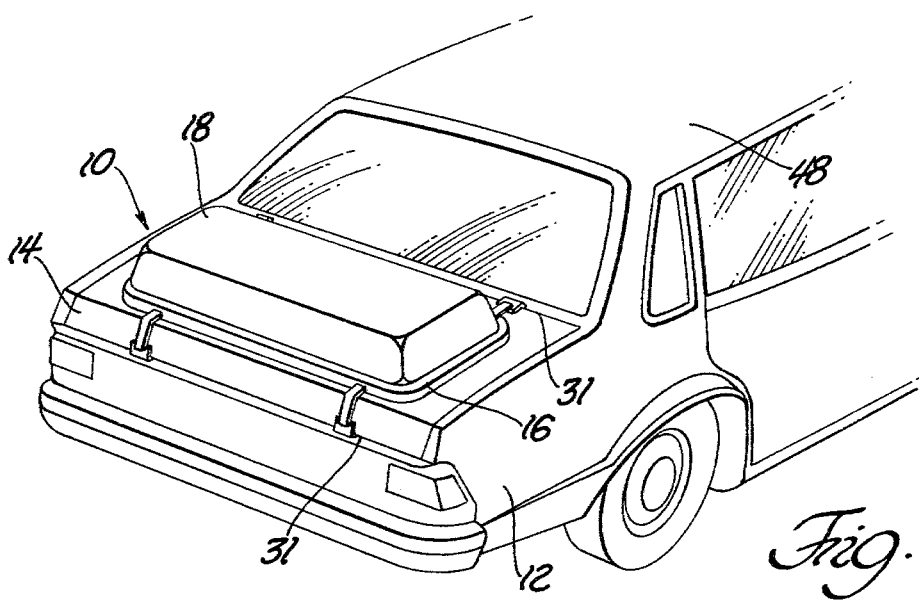
FIG. 1 is a perspective view of the cargo carrier assembly mounted atop a trunk of an automobile.

A cargo carrier assembly for attachment to a body surface of a vehicle constructed in accordance with the instant invention is generally shown at 10 in FIG. 1. The Cargo carrier 10 is shown attached to car 12 atop the trunk 14. The carrier comprises a base member 16 and dome member 18.

Figure 2:
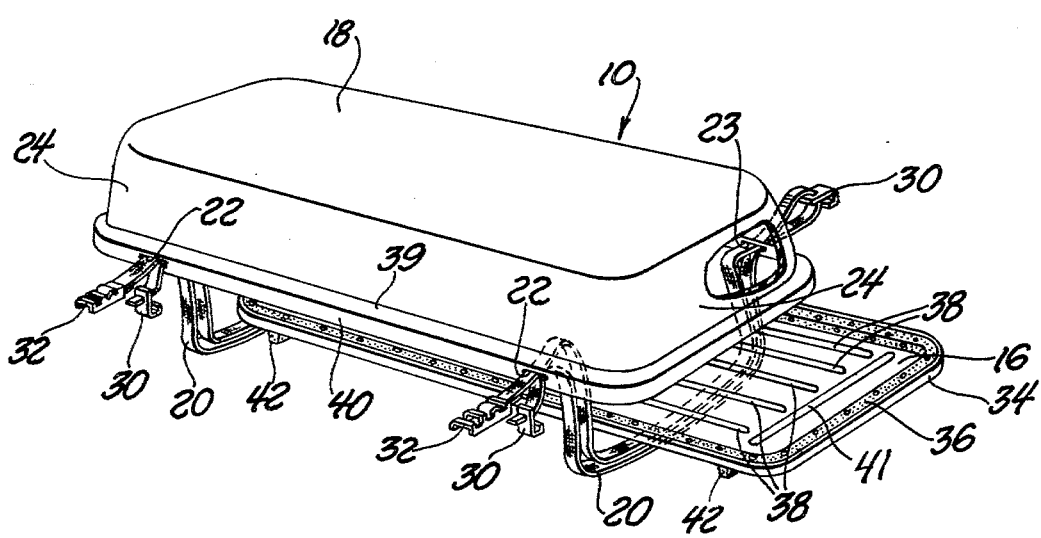
FIG. 2 is an exploded perspective view partially broken away and in cross section of the subject assembly.

As shown in FIG. 2, the dome 18 includes side walls 24 adapted to receive the base member 16. The side walls 24 have holes 22 and 23 therein. The dome 18 can be constructed in various shapes, however, the shown preferred embodiment allows maximal cargo capacity with minimal obstruction of the driver's view out of the rear window. The trunk-mounted design also produces minimal air resistance during operation of the car as compared to cargo carriers mounted atop the roof of the car.

The carrier assembly also comprises attachment means including strap members 20 threadedly engaging one of the holes 22 in one of the side walls 24 and extending under the base member 16 and threadedly engaging one of the holes 23 in the opposite side wall 24 for securing the dome member 18 and base 16 together. The strap member 20 includes securement means thereon for adjustably securing the assembly 10 to the trunk 14 of a vehicle 12. The securement means includes hook members 30 adapted to adjustably receive the strap member 20.

In the preferred embodiment shown in FIG. 2, the strap 20 threads through hole 22 and under base member 16 and through hole 23. The strap threadedly engages hook 30, is rethreaded through hole 23 and under base member 16 and through hole 22. The strap is received by an adjustable receiving member 32. The hooks 30 engage the hinge flanges 31 of a trunk, as shown in FIG. 1. Threading the end portion of the strap member 20 through receiving means 32 affixes the dome member 18 about base member 16 and also secures the asembly 10 to the trunk 14. In other words, a single strap or plurality of straps secure the dome member and base member together and also secure the entire assembly to the trunk hood of a car with no addition of parts required for securing the straps to the assembly.

The same or similar assembly could be mounted atop the roof 48 of the car 12 by merely using the appropriate size strap 20. Again, the strap 20 would secure the dome member 18 to the base member 16 and also secure the assembly 10 to the roof 48 of the car without using additional latches attached to the assembly which would be adapted to receive the strap 20.

As shown in FIG. 2, the assembly 10 includes sealing means 36 disposed between the base member 16 and dome member 18 thereby providing a waterproof seal therebetween. The base member 16 includes an outer edge having an upward flanged portion 34 thereon. The sealing means 36 is adhesively secured to the base 16 adjacent to the flanged portion 34 totally surrounding the outer perimeter of the base 16.

The side walls 24 include an edge having a skirt portion extending downwardly therefrom. In the preferred embodiment shown in FIG. 2, the skirt portion includes a horizontally extending portion 39 and a downwardly extending portion 40. The downwardly extending portion 40 is adapted to receive the outer periphery of the base portion 16 therewithin. The inner surface of the horizontally extending portion 39 engages the sealing means 36 totally about the outer periphery of the base 16 thereby creating the aforementioned waterproof seal. The seal protects any cargo contained within the carrier from external influences such as rain or melting snow.

Figure 3:
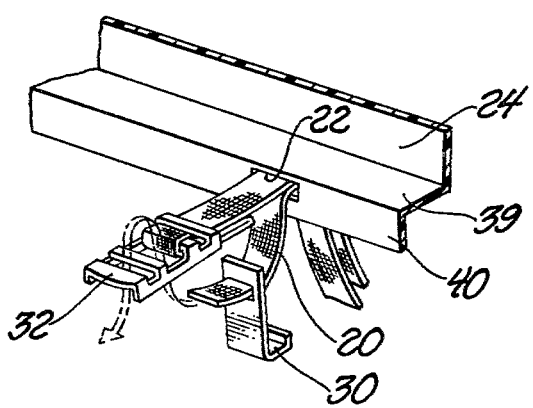
FIG. 3 is a fragmentary perspective view partially broken away and in cross section showing a preferred embodiment of the strap member and attachment means in relation to the dome.
Figure 4:
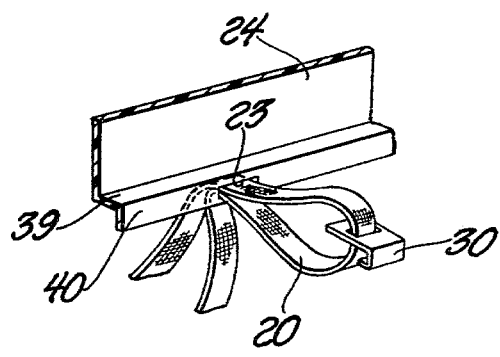
FIG. 4 is a fragmentary perspective view partially broken away and in cross section of the other end portion of the strap member and attachment means in relation to the dome.

The downwardly extending portion 40 of the skirt includes holes 22 and 23 as indicated in FIGS. 3 and 4. Once assembled, the holes 22 and 23 in the downwardly extending portion 40 of the dome 18 extend below the seal 36 thereby allowing access of the strap member 20 to the holes 22 and 23. In the preferred embodiments shown in FIGS. 3 and 4, the hole is within the downwardly extending portion 40. An alternative embodiment provides the holes through a portion extending beyond the downwardly extending portion 40. In other words, the holes need not be directly in the downwardly extending portion 40 of the skirt for proper functioning of the subject invention.

The base member 16 and dome member 18 are made of an organic polymeric material, therefore, the assembly consists of a molded dome 18, a molded base 16 and strap member 20 having hooks 30 thereon. Any changes in the construction of the dome or base can be accomplished merely through the molding process of the part and not by the addition of any parts. Therefore, the specific construction of the base and dome are quite flexible and yet they are quite simple and inexpensive to manufacture.

The base member 16 is generally flat having reinforcing ribs 38 therein providing structural rigidity. The base 16 also includes two ribs 41 extending perpendicular and running along the ends of the reinforcing ribs 38. Pads 42 are adhesively engaged to the bottom surface of the ribs 41 and extend downward thereupon to protect the surface of the car from abrasion by the base 16. As previously mentioned, other modifications can be made to the base portion within the molding process of the plastic without detracting from the subject invention and without adding any additional parts thereto.

The subject invention is, therefore, a lightweight plastic carrier which includes only two plastic molded parts and requires no latches for it to be secured to the trunk hood or roof of a car.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A cargo carrier assembly for attachment to a body surface of a vehicle and comprising; a base member, a dome member including side walls adapted to receive said base member and having holes therein, attachment means including at least one strap member threadedly engaging one of said holes in one of said side walls and extending under said base member and threadedly engaging one of said holes in the opposite of said side walls for securing said dome member and base member together, said strap member including two portions having securement means thereon for adjustably securing said assembly to the body surface of a vehicle.

2. An assembly as set forth in claim 1 including sealing means disposed between said base member and said dome member for providing a waterproof seal therebetween.

3. An assembly as set forth in claim 2 wherein said base member includes an outer edge having an upward extending flanged portion thereon and having said sealing means adhesively secured adjacent to said flanged portion.

4. An assembly as set forth in claim 3 wherein said side walls include an edge having a skirt portion extending downwardly therefrom and about said outer edge of said base member, said skirt portion including said holes for threadedly receiving said strap member.

5. An assembly as set forth in claim 4 wherein said securement means includes hook members adapted to adjustably receive said strap member.

6. An assembly as set forth in claim 5 wherein said base member is generally flat having reinforcing ribs therein for providing structural rigidity and having two runners extending downward from the bottom thereof for engaging the body surface of a car.

7. An assembly as set forth in claim 6 wherein said base member includes pads secured to said runners on the bottom surface of said base for protecting the body surface of the car.

8. An assembly as set forth in claim 7 wherein said base member and said dome member are made of an organic polymeric material.

* * * * *